(12) United States Patent
Reisacher et al.

(10) Patent No.: US 7,384,473 B2
(45) Date of Patent: *Jun. 10, 2008

(54) SOLID PIGMENT PREPARATIONS CONTAINING ANIONIC AND NON-IONIC SURFACE-ACTIVE ADDITIVES

(75) Inventors: Hansulrich Reisacher, Maxdorf (DE); Andreas Stohr, Freinsheim (DE); Ingo Klopp, Weisenheim (DE); Juan Antonio Gonzalez Gomez, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 201 days.

This patent is subject to a terminal disclaimer.

(21) Appl. No.: 10/515,345

(22) PCT Filed: Jun. 18, 2003

(86) PCT No.: PCT/EP03/06409

§ 371 (c)(1),
(2), (4) Date: Dec. 3, 2004

(87) PCT Pub. No.: WO04/000903

PCT Pub. Date: Dec. 31, 2003

(65) Prior Publication Data

US 2005/0235876 A1    Oct. 27, 2005

(30) Foreign Application Priority Data

Jun. 20, 2002  (DE) ................................ 102 27 657

(51) Int. Cl.
- C09D 11/00 (2006.01)
- C09D 11/06 (2006.01)
- C04B 14/00 (2006.01)
- C08K 5/00 (2006.01)
- C08K 5/41 (2006.01)
- C08G 18/77 (2006.01)

(52) U.S. Cl. .................. 106/499; 106/31.6; 106/31.89; 106/400; 106/503; 106/504; 523/160; 524/115; 524/155

(58) Field of Classification Search ............... 106/31.6, 106/31.89, 400, 499, 503–504; 523/160; 524/115, 155

See application file for complete search history.

(56) References Cited

U.S. PATENT DOCUMENTS

| 3,067,053 | A | | 12/1962 | Tarantino |
| 4,002,593 | A | * | 1/1977 | Jones .......................... 523/318 |
| 4,056,402 | A | | 11/1977 | Guzi, Jr. |
| 4,127,422 | A | | 11/1978 | Guzi, Jr. et al. |
| 4,155,773 | A | * | 5/1979 | Ferrill, Jr. ................... 106/413 |
| 4,156,616 | A | | 5/1979 | Dietz et al. |
| 4,443,263 | A | | 4/1984 | Dietz et al. |
| 4,456,485 | A | | 6/1984 | Iyengar et al. |
| 4,871,536 | A | | 10/1989 | Arraudeau et al. |
| 4,872,916 | A | | 10/1989 | Latosky |
| 4,909,853 | A | | 3/1990 | Wienkenhöver et al. |
| 4,927,463 | A | | 5/1990 | Kloetzer et al. |
| 4,986,851 | A | | 1/1991 | Dietz et al. |
| 5,279,654 | A | | 1/1994 | Keirs et al. |
| 5,294,664 | A | * | 3/1994 | Morrison et al. ........... 524/560 |
| 5,324,354 | A | | 6/1994 | Jesse et al. |
| 5,466,482 | A | | 11/1995 | Johnson |
| 5,585,189 | A | * | 12/1996 | Inoue et al. ................. 428/461 |
| 6,110,266 | A | * | 8/2000 | Gonzalez-Blanco et al. ........................ 106/31.65 |
| 6,239,201 | B1 | | 5/2001 | Edelmann et al. |
| 6,428,615 | B1 | * | 8/2002 | Reisacher et al. .......... 106/479 |
| 6,436,178 | B1 | * | 8/2002 | Hosmer .................... 106/31.46 |
| 6,646,023 | B1 | * | 11/2003 | Nyssen ....................... 523/122 |
| 6,689,731 | B2 | | 2/2004 | Esselborn et al. |
| 6,818,050 | B1 | | 11/2004 | Nyssen |
| 2002/0111465 | A1 | | 8/2002 | Linke et al. |
| 2005/0080171 | A1 | | 4/2005 | Reisacher et al. |
| 2005/0090609 | A1 | | 4/2005 | Reisacher et al. |
| 2005/0235876 | A1 | | 10/2005 | Reisacher et al. |

FOREIGN PATENT DOCUMENTS

| DE | 39 14 384 | 10/1990 |
| DE | 199 05 269 | 8/2000 |
| DE | 199 54 401 A1 | 12/2001 |
| DE | 100 35 494 | 1/2002 |
| EP | 0 084645 | 8/1983 |
| EP | 0 256 427 | 2/1988 |

(Continued)

Primary Examiner—J. A. Lorengo
Assistant Examiner—Patricia L Hailey
(74) Attorney, Agent, or Firm—Oblon, Spivak, McClelland, Maier & Neustadt, P.C.

(57) ABSTRACT

Solid pigment preparations comprising as essential constituents
(A) from 60% to <90% by weight of at least one pigment,
(B) >10% to 40% by weight of at least one anionic surface-active additive based on acid phosphoric, phosphonic, sulfuric and/or sulfonic esters of polyalkylene oxides or of reaction products of alkylene oxides with aliphatic alcohols, with phenol or naphthol, which may each be alkyl substituted if desired, with aliphatic or aromatic amines or with aliphatic carboxylic acids or carboxamides or on salts thereof, the fraction of the phosphorus-containing additive in a mixture of phosphorus- and sulfur-containing additives being not less than 50% by weight, and
(C) from 0% to <30% by weight of at least one nonionic surface-active additive based on polyethers,
with the proviso that component (B) is a phosphoric and/or phosphonic ester when the fraction of component (C) is 0% by weight,
are made and used for pigmenting macromolecular organic and inorganic materials.

20 Claims, No Drawings

FOREIGN PATENT DOCUMENTS

| | | |
|---|---|---|
| EP | 0 403 917 | 12/1990 |
| EP | 0 438 090 | 7/1991 |
| EP | 1 103 173 | 5/2001 |
| EP | 1 167 452 A2 | 1/2002 |
| EP | 1 169 394 B1 | 1/2002 |
| EP | 1 174 473 A2 | 1/2002 |
| JP | 51-088523 | 8/1976 |
| JP | 11-124527 | 5/1999 |
| WO | WO 99/55762 | 11/1999 |
| WO | WO 00/47681 | 8/2000 |

* cited by examiner

SOLID PIGMENT PREPARATIONS CONTAINING ANIONIC AND NON-IONIC SURFACE-ACTIVE ADDITIVES

DESCRIPTION

The present invention relates to solid pigment preparations comprising as essential constituents
(A) from 60% to <90% by weight of at least one pigment,
(B) >10% to 40% by weight of at least one anionic surface-active additive based on acid phosphoric, phosphonic, sulfuric and/or sulfonic esters of polyalkylene oxides or of reaction products of alkylene oxides with aliphatic alcohols, with phenol or naphthol, which may each be alkyl substituted if desired, with aliphatic or aromatic amines or with aliphatic carboxylic acids or carboxamides or on salts thereof, the fraction of the phosphorus-containing additive in a mixture of phosphorus- and sulfur-containing additives being not less than 50% by weight, and
(C) from 0% to <30% by weight of at least one nonionic surface-active additive based on polyethers, with the proviso that component (B) is a phosphoric and/or phosphonic ester when the fraction of component (C) is 0% by weight.

The present invention further relates to the production of these pigment preparations and to their use for pigmenting macromolecular organic and inorganic materials.

Liquid systems such as coatings, varnishes, emulsion paints and printing inks are customarily colored using pigment formulations which comprise water, organic solvent or mixtures thereof. As well as anionic, cationic, nonionic or amphoteric dispersants, these pigment formulations generally have to be additized with further assistants, such as dried-crust inhibitors, freeze resistance enhancers, thickeners and anti-skinners, for stabilization.

There is a need for novel pigment preparations which are comparable to the liquid formulations with regard to color properties and dispersibility, but do not require the additions mentioned and are easier to handle. However, simply drying the liquid formulations does not provide solid pigment preparations having comparable performance properties.

DE-A-39 14 384 describes pigment preparations which, as well as the finely divided pigment (not less than 3.9% by weight), comprise basic pigment derivatives and (not more than 9.5% by weight) of phosphoric esters of polyethylene glycols and of alkylene oxide adducts with oxo process and fatty alcohols and are used for producing flowable printing inks and stock pastes.

EP-A-1 103 173, inter alia, mentions anionically modified phenol-styrene polyglycol ethers as dispersants for solid pigment preparations used as colorants for seed dressing. However, the explicitly disclosed pigment preparations only comprise nonionic dispersants based on reaction products of hydrogenated castor oil with ethylene oxide.

DE-A-100 35 494 discloses solid formulations of metal complex pigments with included melamine. Anionic, cationic, amphoteric and nonionic dispersants are mentioned as useful, but the dispersant actually used is a sulfated ethoxylated fatty alcohol.

DE-A-199 05 269 describes solid pigment formulations which comprise dispersants based on nonionic modified phenol-styrene polyglycol ethers or mixtures of ethoxylated castor oil with minor amounts of these ethers or of phosphonic esters and additionally always a thickener based on optionally partially hydrogenated polyvinyl alcohol or on anionic polyhydroxy compounds and are used for pigmenting waterborne application media.

EP-A-256 427 concerns pigment preparations for cosmetic articles that comprise mixtures of anionic dispersants based on alkylglycol ether sulfates and phosphoric esters of optionally ethoxylated fatty alcohols; the sulfates are always present in excess in the mixtures.

EP-A-84 645 and 403 917 disclose highly concentrated, solid pigment formulations for coloring aqueous, alcoholic and aqueous-alcoholic coatings and printing inks that comprise up to 30% by weight of an additive based on reaction products of at least bifunctional amines with propylene oxide and ethylene oxide, but no anionic additive.

U.S. Pat. Nos. 4,056,402 and 4,127,422 describe dry nondusting pigment compositions for waterborne finish systems. However, these pigment compositions, as well as nonionic dispersants, comprise as an essential constituent at least 10% by weight of water-soluble cellulose ethers or of water-dispersible polyvinyl compounds and hence differ from the pigment preparations of the present invention.

Prior German patent application 102 04 583.6 discloses pigment preparations which comprise from 60% to 90% by weight of a pigment, from 10% to 40% by weight of a nonionic surface-active additive based on polyethers and from 0.1% to 10% by weight of an anionic surface-active additive based on sulfonates or sulfates.

It is an object of the present invention to provide solid pigment preparations having altogether advantageous application properties, in particular high color strength and particularly good stir-in dispersibility in a wide variety of application media.

We have found that this object is achieved by pigment preparations comprising as essential constituents
(A) from 60% to <90% by weight of at least one pigment,
(B) >10% to 40% by weight of at least one anionic surface-active additive based on acid phosphoric, phosphonic, sulfuric and/or sulfonic esters of polyalkylene oxides or of reaction products of alkylene oxides with aliphatic alcohols, with phenol or naphthol, which may each be alkyl substituted if desired, with aliphatic or aromatic amines or with aliphatic carboxylic acids or carboxamides or on salts thereof, the fraction of the phosphorus-containing additive in a mixture of phosphorus- and sulfur-containing additives being not less than 50% by weight, and
(C) from 0% to <30% by weight of at least one nonionic surface-active additive based on polyethers, with the proviso that component (B) is a phosphoric and/or phosphonic ester when the fraction of component (C) is 0% by weight.

The present invention further provides a process for preparing pigment preparations, which comprises wet-comminuting the pigment (A) in aqueous suspension in the presence of some or all of additive (B) and/or (C) and then drying the suspension, if necessary after the rest of additive (B) and/or (C) has been added.

The present invention yet further provides a process for pigmenting macromolecular organic and inorganic materials, which comprises incorporating the pigment preparations into these materials by stirring or shaking.

The pigment preparations of the present invention comprise as essential constituents a pigment (A) and an anionic surface-active additive (B) and, if desired, a nonionic surface-active additive (C).

Component (A) in the pigment preparations of the present invention may be an organic pigment or an inorganic pigment. It will be appreciated that the pigment preparations may also comprise mixtures of various organic or various inorganic pigments or mixtures of organic and inorganic pigments.

The pigments are present in finely divided form. Accordingly the pigments typically have average particle sizes from 0.1 to 5 μm.

The organic pigments are typically organic chromatic and black pigments. Inorganic pigments can likewise be color pigments (chromatic, black and white pigments) and also luster pigments and the inorganic pigments typically used as fillers.

There now follow examples of suitable organic color pigments:
monoazo pigments: C.I. Pigment Brown 25;
  C.I. Pigment Orange 5, 13, 36, 64 and 67;
  C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
  C.I. Pigment Yellow 1, 3, 62, 65, 73, 74, 97, 120, 151, 154, 168, 181, 183 and 191;
  C.I. Pigment Violet 32;
disazo pigments: C.I. Pigment Orange 16, 34, 44 and 72;
  C.I. Pigment Yellow 12, 13, 14, 16, 17, 81, 83, 106, 113, 126, 127, 155, 174, 176, 180 and 188;
disazo condensation
pigments: C.I. Pigment Yellow 93, 95 and 128;
  C.I. Pigment Red 144, 166, 214, 220, 221, 242 and 262;
  C.I. Pigment Brown 23 and 41;
anthanthrone pigments: C.I. Pigment Red 168;
anthraquinone pigments: C.I. Pigment Yellow 147, 177 and 199;
  C.I. Pigment Violet 31;
anthrapyrimidine pigments: C.I. Pigment Yellow 108;
quinacridone pigments: C.I. Pigment Orange 48 and 49;
  C.I. Pigment Red 122, 202, 206 and 209;
  C.I. Pigment Violet 19;
quinophthalone pigments: C.I. Pigment Yellow 138;
diketopyrrolopyrrole pigments: C.I. Pigment Orange 71, 73 and 81;
  C.I. Pigment Red 254, 255, 264, 270 and 272;
dioxazine pigments: C.I. Pigment Violet 23 and 37;
  C.I. Pigment Blue 80;
flavanthrone pigments: C.I. Pigment Yellow 24;
indanthrone pigments: C.I. Pigment Blue 60 and 64;
isoindoline pigments: C.I. Pigments Orange 61 and 69;
  C.I. Pigment Red 260;
  C.I. Pigment Yellow 139 and 185;
isoindolinone pigments: C.I. Pigment Yellow 109, 110 and 173;
isoviolanthrone pigments: C.I. Pigment Violet 31;
metal complex pigments: C.I. Pigment Red 257;
  C.I. Pigment Yellow 117, 129, 150, 153 and 177;
  C.I. Pigment Green 8;
perinone pigments: C.I. Pigment Orange 43;
  C.I. Pigment Red 194;
perylene pigments: C.I. Pigment Black 31 and 32;
  C.I. Pigment Red 123, 149, 178, 179, 190 and 224;
  C.I. Pigment Violet 29;
phthalocyanine pigments: C.I. Pigment Blue 15, 15:1, 15:2, 15:3, 15:4, 15:6 and 16;
  C.I. Pigment Green 7 and 36;
pyranthrone pigments: C.I. Pigment Orange 51;
  C.I. Pigment Red 216;
pyrazoloquinazolone pigments: C.I. Pigment Orange 67;
  C.I. Pigment Red 251;
thioindigo pigments: C.I. Pigment Red 88 and 181;
  C.I. Pigment Violet 38;
triarylcarbonium pigments: C.I. Pigment Blue 1, 61 and 62;
  C.I. Pigment Green 1;
  C.I. Pigment Red 81, 81:1 and 169;
  C.I. Pigment Violet 1, 2, 3 and 27;
C.I. Pigment Black 1 (aniline black);
C.I. Pigment Yellow 101 (aldazine yellow);
C.I. Pigment Brown 22.

Examples of suitable inorganic color pigments are:
white pigments: titanium dioxide (C.I. Pigment White 6), zinc white, pigment grade zinc oxide; zinc sulfide, lithopone;
black pigments: iron oxide black (C.I. Pigment Black 11), iron manganese black, spinel black (C.I. Pigment Black 27); carbon black (C.I. Pigment Black 7);
chromatic pigments: chromium oxide, chromium oxide hydrate green; chrome green (C.I. Pigment Green 48); cobalt green (C.I. Pigment Green 50); ultramarine green;
  cobalt blue (C.I. Pigment Blue 28 and 36; C.I. Pigment Blue 72); ultramarine blue; manganese blue;
  ultramarine violet; cobalt violet and manganese violet;
  red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red;
  brown iron oxide (C.I. Pigment Brown 6 and 7), mixed brown, spinel phases and corundum phases (C.I. Pigment Brown 29, 31, 33, 34, 35, 37, 39 and 40), chromium titanium yellow (C.I. Pigment Brown 24), chrome orange;
  cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminum oxide, aluminum hydroxide, natural micas, natural and precipitated chalk and barium sulfate.

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

Component (B) of the pigment preparations according to the present invention is at least one anionic surface-active additive based on acid phosphoric, phosphonic, sulfuric and/or sulfonic esters of polyalkylene oxides or of reaction products of alkylene oxides with aliphatic alcohols, with phenol or naphthol, which may each be alkyl substituted if desired, with aliphatic or aromatic amines or with aliphatic carboxylic acids or carboxamides or on salts thereof, the fraction of phosphorus-containing additive in a mixture of phosphorus- and sulfur-containing additives being not less than 50% by weight.

For the purposes of the present invention, the term "alkylene oxide" shall also comprehend aryl-substituted alkylene oxide, especially phenyl-substituted ethylene oxide.

Useful starting materials for the (B) additives include unmixed polyalkylene oxides, preferably $C_2$-$C_4$-alkylene oxides and phenyl-substituted $C_2$-$C_4$-alkylene oxides, especially polyethylene oxides, polypropylene oxides and poly (phenylethylene oxide)s, particularly block copolymers, especially polymers having propylene oxide and polyethylene oxide blocks or poly(phenylethylene oxide) and polyethylene oxide blocks, and also random copolymers of these alkylene oxides.

These polyalkylene oxides are preparable by polyaddition of the alkylene oxides to starter molecules, as to saturated or unsaturated aliphatic alcohols, to phenol or naphthol, which may each be substituted by alkyl, especially $C_1$-$C_{12}$-alkyl, preferably $C_4$-$C_{12}$-alkyl and $C_1$-$C_4$-alkyl respectively, to saturated or unsaturated aliphatic and aromatic amines and to saturated or unsaturated aliphatic carboxylic acids and carboxamides. It is customary to use from 1 to 300 mol and preferably from 3 to 150 mol of alkylene oxide per mole of starter molecule.

Suitable aliphatic alcohols contain in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol and 9-octadecenol and also mixtures of these alcohols, such as $C_8/C_{10}$, $C_{13}/C_{15}$ and $C_{16}/C_{18}$ alcohols, and cyclopentanol and cyclohexanol. Of particular interest are the saturated or unsaturated fatty alcohols obtained from natural raw materials by fat hydrolysis and reduction and the synthetic fatty alcohols from the oxo process. The alkylene oxide adducts with these alcohols typically have average molecular weights $M_n$ from 200 to 5 000.

Examples of the abovementioned aromatic alcohols include not only unsubstituted phenol and α- and β-naphthol but also hexylphenol, heptylphenol, octylphenol, nonylphenol, isononylphenol, undecylphenol, dodecylphenol, di- and tributylphenol and dinonylphenol.

Suitable aliphatic amines correspond to the abovementioned aliphatic alcohols. Again of particular importance here are the saturated and unsaturated fatty amines which preferably have from 14 to 20 carbon atoms. Examples of suitable aromatic amines are aniline and its derivatives.

Useful aliphatic carboxylic acids include especially saturated and unsaturated fatty acids which preferably contain from 14 to 20 carbon atoms and fully hydrogenated, partially hydrogenated and unhydrogenated resin acids and also polyfunctional carboxylic acids, for example dicarboxylic acids, such as maleic acid.

Suitable carboxamides are derived from these carboxylic acids.

As well as alkylene oxide adducts with monofunctional amines and alcohols it is alkylene oxide adducts with at least bifunctional amines and alcohols which are of interest for use as starting materials for esterification and especially also without further esterification as nonionic additives (C).

The at least bifunctional amines preferably have from 2 to 5 amine groups and conform in particular to the formula $H_2N$—(R—$NR^1{}_n$)—H (R: $C_2$-$C_6$-alkylene; $R^1$: hydrogen or $C_1$-$C_6$-alkyl; n: 1-5). Specific examples are: ethylenediamine, diethylenetriamine, triethylenetetramine, tetraethylenepentamine, 1,3-propylene-diamine, dipropylenetriamine, 3-amino-1-ethyleneaminopropane, hexamethylenediamine, dihexamethylenetriamine, 1,6-bis(3-amino-propylamino) hexane and N-methyldipropylenetriamine, of which hexamethylenediamine and diethylenetriamine are more preferable and ethylenediamine is most preferable.

These amines are preferably reacted first with propylene oxide and then with ethylene oxide. The ethylene oxide content of the block copolymers is typically about 10-90% by weight.

The average molecular weights $M_n$ of the block copolymers based on polyamines are generally in the range from 1 000 to 40 000 and preferably in the range from 1 500 to 30 000.

The at least bifunctional alcohols preferably have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol and polyethylene glycol, glycerol and pentaerythritol and also 1,2-cyclohexanediol and sugar derivatives, such as sorbitan and isosorbitol, of which ethylene glycol and polyethylene glycol are more preferable and propylene glycol and dipropylene glycol are most preferable.

Particularly preferred alkylene oxide adducts with at least bifunctional alcohols have a central polypropylene oxide block, ie are based on a propylene glycol or polypropylene glycol which is initially reacted with further propylene oxide and then with ethylene oxide. The ethylene oxide content of the block copolymers is typically in the range from 10% to 90% by weight.

The average molecular weights $M_n$ of the block copolymers based on polyhydric alcohols are generally in the range from 1 000 to 20 000 and preferably in the range from 1 000 to 15 000.

Reaction with phosphoric acid, phosphorus pentoxide and phosphonic acid on the one hand or with sulfuric acid and sulfonic acid on the other converts the alkoxylation products into the phosphoric mono- or diesters and phosphonic esters on the one hand and the sulfuric monoesters and sulfonic esters on the other. These acid esters are preferably in the form of water-soluble salts, especially as alkali metal salts, in particular sodium salts, and ammonium salts, but can also be used in the form of the free acids.

Preferred phosphates and phosphonates are derived in particular from alkoxylated and especially ethoxylated fatty and oxo process alcohols, alkylphenols, fatty amines, fatty acids and resin acids, while preferred sulfates and sulfonates are based in particular on alkoxylated and especially ethoxylated fatty alcohols, alkylphenols and amines, including polyfunctional amines.

Such anionic surface-active additives are known and commercially available for example under the names of Crodafos® (Croda), Rhodafac® (Rhodia), Maphos® (BASF), Texapon® (Cognis), Empicol® (Albright & Wilson), Matexil® (ICI), Soprophor® (Rhodia) and Lutensit® (BASF).

Component (C) of the pigment preparations according to the present invention is at least one nonionic surface-active additive based on polyethers. Suitable polyethers in this context are in particular the abovementioned polyalkylene oxides and alkylene oxide adducts.

Such nonionic surface-active additives are likewise known and commercially available for example under the names of Tetronic® and Pluronic® (BASF).

The pigment preparations according to the present invention comprise from 60% to <90% (especially 89%) by weight of component (A), >10% (especially 11%) to 40% by weight of component (B) and from 0 to <30% (especially 29%) by weight of component (C).

When the pigment preparations according to the present invention do not comprise any nonionic additive (C), the preferred composition is from 70% to 89% by weight of pigment (A) and from 11% to 30% by weight of a phosphate and/or phosphonate (B).

When a nonionic additive (C) is included, the composition of the pigment preparations according to the present invention is preferably from 70% to 88% by weight of component (A), from 11% to 29% by weight of the anionic additive (B) and from 1% to 19% by weight of the nonionic additive (C).

The pigment preparations according to the present invention are advantageously obtainable by the process of the invention by wet-comminuting the pigment (A) in aqueous suspension in the presence of some or all of additive (B) and/or (C) and then drying the suspension, if necessary after the rest of additive (B) and/or (C) has been added.

Pigment (A) can be used in the process of the present invention as a dry powder or in the form of a presscake.

The pigment (A) as used is preferably a finished product, ie the primary particle size of the pigment has already been adjusted to the desired application value. This finish is advisable in the case of organic pigments especially, since the as-synthesized crude material is generally not directly suitable for use. In the case of inorganic pigments, for example in the case of oxide and bismuth vanadate pigments, the primary particle size can also be adjusted in the course of the synthesis of the pigment, so that the as-synthesized pigment suspensions can be used directly in the process of the present invention.

Since the finished pigment (A) typically reagglomerates in the course of drying or on the filter assembly, it is subjected to wet comminution, for example grinding in a stirred media mill, in aqueous suspension.

The wet comminution should be carried out in the presence of at least a portion of the additive (B,C) for the ready-produced pigment preparation, and it is preferable to add the entire amount of additive (B,C) prior to the wet comminution.

The particle size of the pigment preparations of the present invention can be controlled to a specific value, depending on the chosen method of drying—spray granulation and fluidized bed drying, spray drying, drying in a paddle dryer, evaporation and subsequent comminution.

Spray and fluidized bed granulation may produce coarsely divided granules having average particle sizes from 50 to 5 000 μm, and especially from 100 to 1 000 μm. Spray drying typically produces granules having average particle sizes <20 μm. Finely divided preparations are obtainable by drying in a paddle dryer and by evaporation with subsequent grinding. Preferably, however, the pigment preparations of the present invention are in granule form.

Spray granulation is preferably carried out in a spray tower using a one-material nozzle. Here, the suspension is sprayed in the form of relatively large drops, and the water evaporates. The additives melt at the drying temperatures and so lead to the formation of a substantially spherical granule having a particularly smooth surface (BET values generally $\leq 15$ m$^2$/g, and especially $\leq 10$ m$^2$/g).

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is preferably <2% by weight.

The pigment preparations of the present invention are notable in use for their excellent color properties which are comparable to those of liquid pigment formulations, especially with regard to color strength, brilliance, hue and hiding power, and in particular for their stir-in characteristics, ie they can be dispersed in application media with a minimal input of energy, simply by stirring or shaking. This applies in particular to the coarsely divided pigment granules, which constitute the preferred embodiment of the pigment preparations of the present invention.

Compared with liquid pigment formulations, the pigment preparations of the present invention additionally have the following advantages: They have a higher pigment content. Whereas liquid formulations tend to change viscosity during storage and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability and also dustlessness in handling and application.

The pigment preparations of the present invention are very useful for pigmenting macromolecular organic and inorganic materials of any kind. Liquid application media in this context can be purely aqueous; comprise mixtures of water and organic solvents, for example alcohols; or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

If desired, the preparations can initially be stirred into a solvent which is compatible with the particular application medium, again with minimal input of energy, and then be introduced into this application medium. For instance, slurries of pigment preparations in glycols or other solvents customary in the paint and coatings industry, such as methoxypropyl acetate, can be used to render the pigment preparations for aqueous systems compatible with hydrocarbonaceous systems or systems based on nitro-cellulose.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; solventborne printing inks, for example offset printing inks, flexographic printing inks, toluene gravure printing inks, textile printing inks, radiation-curable printing inks; waterborne inks, including inkjet inks; color filters; building materials (water is typically added only after building material and granular pigment have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

The pigment preparations of the present invention are particularly useful as mixing components in color-mixing or -matching systems. Owing to their stir-in characteristics, they can be used directly as a solid for this purpose. If desired, however, they can also be first converted into base colors, mixing varnishes and tinting colors (especially into colors having a high solids content, "HS colors"), or even more highly pigmented tinting pastes which then constitute the components of the mixing system. The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

EXAMPLES

Making and testing of granular pigment preparations according to the invention

The pigment granules were made by a suspension of x kg of finished pigment (A), y kg of additive (B) and z kg of additive (C) in 150 kg of water being adjusted to pH 7 by addition of 25% by weight aqueous sodium hydroxide solution, ball milled to a $d_{50}$ value of <1 μm and then spray granulated in a spray tower using a one-material nozzle at a gas inlet temperature of 165° C. and a gas outlet temperature of 70° C.

The color strength of the pigment granules was determined colorimetrically in the white reduction (reported in terms of the DIN 55986 coloring equivalents CEs) in a waterborne emulsion paint. To this end, a mixture of in each case 1.25 g of granular pigment and 50 g of a waterborne styrene-acrylate-based test binder having a white pigment content of 16.4% by weight ($TiO_2$, Kronos 2043) (BASF test binder 00-1067) were homogenized in a 150 ml plastic beaker by running a high speed stirrer at 1 500 rpm for 3 min. The color obtained was then drawn down on a black and white test card using a 100 μm wire-wound film applicator and dried for 30 min.

The corresponding emulsion paints made using commercially available aqueous formulations of the pigments were assigned the CE value of 100 (standard). CE values <100 mean a higher color strength than that of the standard, CE>100 accordingly a lower color strength.

The table hereinbelow lists the compositions of the pigment granules produced and the CE values obtained in each case. The additives (B) and (C) used were as follows:

B1: acid phosphoric ester based on ethoxylated $C_8$-$C_{10}$ oxo process alcohol (6 mol of EO/mole of alcohol)

B2: acid sulfuric ester based on ethoxylated $C_{16}$-$C_{18}$ fatty alcohol (3 mol of EO/mole of alcohol)

C: propylene oxide/ethylene oxide block copolymer having a central polypropylene oxide block, an ethylene oxide content of 50% by weight and an average molecular weight $M_n$ of 6 500

TABLE

| | Pigment | | Additive | | Additive (C) | |
|---|---|---|---|---|---|---|
| Ex. | (A) | x kg | (B) | y kg | z kg | CE |
| 1 | P.Y. 74 | 75 | B1 | 25 | — | 101 |
| 2 | P.Y. 74 | 70 | B1 | 15 | 15 | 98 |
| 3 | P.Y. 138 | 75 | B1 | 25 | — | 98 |
| 4 | P.Y. 138 | 75 | B2 | 25 | — | 102 |
| 5 | P.Y. 138 | 70 | B1 | 15 | 15 | 99 |
| 6 | P.Y. 138 | 75 | B1 | 20 | 5 | 102 |
| 7 | P.B. 15:3 | 75 | B1 | 25 | — | 100 |
| 8 | P.B. 15:3 | 80 | B2 | 20 | — | 100 |
| 9 | P.B. 15:3 | 75 | B1 | 20 | 5 | 102 |
| 10 | P.G. 7 | 75 | B1 | 25 | — | 102 |
| 11 | P.G. 7 | 75 | B2 | 25 | — | 101 |
| 12 | P.G. 7 | 75 | B1 | 11 | 14 | 100 |
| 13 | P.Bk. 7 | 75 | B1 | 25 | — | 103 |

We claim:

1. A solid pigment preparation comprising as essential constituents:
   (A) from 60% to <90%, by weight of the preparation, of at least one pigment,
   (B) >10% to 40%, by weight of the preparation, of at least one anionic surface-active additive, based on (1) acid phosphoric, phosphonic, sulfuric and/or sulfonic esters of polyalkylene oxides, (2) acid phosphoric, phosphonic, sulfuric and/or sulfonic esters of reaction products of alkylene oxides with aliphatic alcohols, (3) acid phosphoric, phosphonic, sulfuric and/or sulfonic esters of reaction products of alkylene oxides with phenol or naphthol, which may each be optionally alkyl substituted, (4) acid phosphoric. phosphonic, sulfuric and/or sulfonic esters of reaction products of alkylene oxides with aliphatic or aromatic amines, (5) acid phosphoric, phosphonic, sulfuric and/or sulfonic esters of reaction products of alkylene oxides with aliphatic carboxylic acids or carboxamides, (6) salts of the esters (1)-(5), and wherein the fraction of the phosphorus-containing additive in a mixture of phosphorus- and sulfur-containing additives is not less than 50% by weight, and
   (C) from 0% to <30%, by weight of the preparation, of at least one nonionic surface-active additive based on polyethers,
   with the proviso that component (B) is a phosphoric and/or phosphonic ester when the fraction of component (C) is 0% by weight.

2. The pigment preparation as claimed in claim 1, comprising from 70% to 89%, by weight, of component (A) and from 11% to 30%, by weight, of component (B).

3. The pigment preparation as claimed in claim 1, comprising from 70% to 88%, by weight, of component (A), from 11% to 29%, by weight, of component (B) and from 1% to 19%, by weight, of component (C).

4. The pigment preparation as claimed in claim 1, wherein the preparation is in the form of granules, having an average particle size from 50 to 5,000 μm and a BET surface area of $\leq 15$ m$^2$/g.

5. A process for producing a pigment preparation as claimed in claim 1, which comprises wet-comminuting the pigment (A) in aqueous suspension, in the presence of some or all of additive (B) and/or (C), and then drying the suspension, if necessary, after the rest of additive (B) and/or (C) has been added.

6. A process for pigmenting a macromolecular organic material and/or an inorganic material, which comprises incorporating the pigment preparation, as claimed in claim 1, into said material by stirring or shaking.

7. The process as claimed in claim 6, wherein the macromolecular organic material and/or the inorganic material is selected from the group consisting of coatings, paints, inks, printing inks, and finish systems where the liquid phase comprises water, organic solvent or mixtures of water and organic solvents.

8. A process for pigmenting a macromolecular organic material and/or an inorganic material, which comprises adding the pigment preparation as claimed in claim 1, as a mixing component, to one or more components of a color mixing system.

9. The pigment preparation as claimed in claim 2, wherein the preparation is in the form of granules, having an average particle size from 50 to 5,000 µm and a BET surface area of $\leq 15$ m$^2$/g.

10. The pigment preparation as claimed in claim 3, wherein the preparation is in the form of granules, having an average particle size from 50 to 5,000 µm and a BET surface area of $\leq 15$ m$^2$/g.

11. A process for producing a pigment preparation as claimed in claim 2, which comprises wet-comminuting the pigment (A) in aqueous suspension, in the presence of some or all of additive (B) and/or (C), and then drying the suspension, if necessary, after the rest of additive (B) and/or (C) has been added.

12. A process for producing a pigment preparation as claimed in claim 3, which comprises wet-comminuting the pigment (A) in aqueous suspension, in the presence of some or all of additive (B) and/or (C), and then drying the suspension, if necessary, after the rest of additive (B) and/or (C) has been added.

13. A process for producing a pigment preparation as claimed in claim 4, which comprises wet-comminuting the pigment (A) in aqueous suspension, in the presence of some or all of additive (B) and/or (C), and then drying the suspension, if necessary, after the rest of additive (B) and/or (C) has been added.

14. A process for pigmenting a macromolecular organic material and/or an inorganic material, which comprises incorporating the pigment preparation, as claimed in claim 2, into said material by stirring or shaking.

15. A process for pigmenting a macromolecular organic material and/or an inorganic material, which comprises incorporating the pigment preparation, as claimed in claim 3, into said material by stirring or shaking.

16. A process for pigmenting a macromolecular organic material and/or an inorganic material, which comprises incorporating the pigment preparation, as claimed in claim 4, into said material by stirring or shaking.

17. The process as claimed in claim 14, wherein the macromolecular organic material and/or the inorganic material is selected from the group consisting of coatings, paints, inks, printing inks, and finish systems where the liquid phase comprises water, organic solvent or mixtures of water and organic solvents.

18. The process as claimed in claim 15, wherein the macromolecular organic material and the inorganic material is selected from the group consisting of coatings, paints, inks, printing inks, and finish systems where the liquid phase comprises water, organic solvent or mixtures of water and organic solvents.

19. The process as claimed in claim 16, wherein the macromolecular organic material and/or the inorganic material is selected from the group consisting of coatings, paints, inks, printing inks, and finish systems where the liquid phase comprises water, organic solvent or mixtures of water and organic solvents.

20. A process for pigmenting a macromolecular organic material and/or an inorganic material, which comprises adding the pigment preparation as claimed in claim 2, as a mixing component, to one or more components of a color mixing system.

* * * * *